United States Patent
Cheon et al.

(10) Patent No.: US 8,687,592 B2
(45) Date of Patent: Apr. 1, 2014

(54) METHOD FOR SWITCHING SESSION OF USER EQUIPMENT IN WIRELESS COMMUNICATION SYSTEM AND SYSTEM EMPLOYING THE SAME

(75) Inventors: Jung-Hoon Cheon, Suwon-si (KR); Ok-Seon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 12/840,489

(22) Filed: Jul. 21, 2010

(65) Prior Publication Data

US 2011/0019644 A1    Jan. 27, 2011

(30) Foreign Application Priority Data

Jul. 22, 2009   (KR) ................ 10-2009-0066758

(51) Int. Cl.
*H04W 4/00* (2009.01)
*H04W 36/00* (2009.01)
*H04W 84/04* (2009.01)

(52) U.S. Cl.
CPC ........ *H04W 36/0033* (2013.01); *H04W 84/045* (2013.01)
USPC ....................................... 370/331

(58) Field of Classification Search
CPC ............ H04W 36/0033; H04W 36/04; H04W 84/045
USPC ................... 370/331, 332, 338; 455/436, 509
See application file for complete search history.

(56) References Cited

U.S. PATENT DOCUMENTS

| | | | |
|---|---|---|---|
| 2001/0041569 A1 | 11/2001 | Rahman | |
| 2007/0097938 A1* | 5/2007 | Nylander et al. | 370/338 |
| 2007/0280175 A1 | 12/2007 | Cheng et al. | |
| 2008/0220782 A1 | 9/2008 | Wang et al. | |
| 2008/0293419 A1 | 11/2008 | Somasundaram et al. | |
| 2009/0156213 A1* | 6/2009 | Spinelli et al. | 455/436 |
| 2009/0285166 A1* | 11/2009 | Huber et al. | 370/329 |
| 2010/0041364 A1* | 2/2010 | Lott et al. | 455/404.1 |
| 2010/0242103 A1* | 9/2010 | Richardson et al. | 726/7 |
| 2010/0278141 A1* | 11/2010 | Choi-Grogan et al. | 370/331 |

* cited by examiner

*Primary Examiner* — Pao Sinkantarakorn
*Assistant Examiner* — Richard K Chang
(74) *Attorney, Agent, or Firm* — Jefferson IP Law, LLP

(57) ABSTRACT

A system and method for switching a session of a User Equipment (UE) in a wireless communication system are provided. According to the method, if the UE performs a handover from a macro base station of a macro cell to a femto base station of a femto cell, a femto base station transmits a path switch request message, which includes a serving gateway relocation Information Element (IE), to a Mobility Management Entity (MME) of the macro cell, in order to request a switching from an existing session of the UE to a new session managed by the femto base station. Then, in response to the path switch request message, the MME switches the existing session of the UE to the new session and transmits a path switch approval message to the femto base station. The serving gateway relocation IE includes information requesting relocation of a serving gateway of the UE to a femto serving gateway within the femto cell.

21 Claims, 5 Drawing Sheets

METHOD FOR SWITCHING SESSION OF USER EQUIPMENT IN WIRELESS COMMUNICATION SYSTEM AND SYSTEM EMPLOYING THE SAME

PRIORITY

This application claims the benefit under 35 U.S.C. §119(a) of a Korean patent application filed in the Korean Intellectual Property Office on Jul. 22, 2009 and assigned Serial No. 10-2009-0066758, the entire disclosure of which is hereby incorporated by reference.

BACKGROUND OF THE INVENTION

1. Field of the Invention

The present invention relates to an apparatus and method for performing wireless communication. More particularly, the present invention relates to an apparatus and method for switching a session of a User Equipment (UE) in a wireless communication system.

2. Description of the Related Art

Recently, there has been an increased use and application of a wireless communication system that uses a data packet service. For example, it is a current trend that a Home enhanced Node B (HeNB) is installed indoors, such as at home or in an office. The HeNB installed indoors is generally called a femto base station. With a femto base station, which provides a femto cell as a service coverage area, a user is provided access to wired or wireless communications by using a User Equipment (UE) within the femto cell. In contrast, a base station and a cell, each of which has a relatively normal size and a normal function, are called a macro base station and a macro cell, respectively.

Using a femto base station, all of the data packets transmitted from a UE within a femto cell are transmitted through the femto base station to a donor network located within a macro cell, and are then transmitted through the donor network to a corresponding network. Therefore, it is problematic in that the data transmitted from the UE must pass through the donor network before being transmitted to its destination.

That is, even data packets, which need not pass through a donor network, must pass through the donor network according to the current configuration. For example, when a user wants to access the Internet through a UE within a femto cell in order to control an appliance within a home or an office, the data packets transmitted from the UE are transferred to the home appliance after passing through a donor network. This causes an unnecessary increase in load due to the data packet transmission through the donor network, and a delay in the transmission of the data packets due to the inefficient data packet transmission path.

Accordingly, there is a need for a method that enables a UE located within a femto cell to perform a communication with a home appliance without passing through a donor network, and a method that enables a UE located within a femto cell to perform a direct communication with an external Internet network.

SUMMARY OF THE INVENTION

An aspect of the present invention is to address at least the above-mentioned problems and/or disadvantages and to provide at least the advantages described below. Accordingly, an aspect of the present invention is to provide a method for switching a session of a User Equipment (UE) in a wireless communication system, and the wireless communication system employing the method.

Another aspect of the present invention is to provide a method for switching a session in a macro cell to a session in a femto cell through a system in the femto cell when a UE that is receiving a packet communication service in the macro cell has entered the femto cell in a wireless communication system, and the wireless communication system employing the method.

Also, another aspect of the present invention is to provide a session switching method for effectively establishing a transmission path of packet data transmitted within a femto cell in a wireless communication system, and the wireless communication system employing the method.

In accordance with an aspect of the present invention, a method for switching a session of a User Equipment (UE) by a Mobility Management Entity (MME) in a wireless communication system is provided. The method includes, if the UE performs a handover from a macro base station of a macro cell to a femto base station of a femto cell, receiving a path switch request message, which includes a serving gateway relocation Information Element (IE) for requesting a switching from an existing session of the UE to a new session managed by the femto base station, from the femto base station, and in response to the path switch request message, switching the existing session of the UE to the new session and transmitting a path switch approval message to the femto base station, wherein the serving gateway relocation IE includes information requesting relocation of a serving gateway of the UE to a femto serving gateway within the femto cell.

In accordance with another aspect of the present invention, a method for switching a session of a UE by a femto base station of a femto cell in a wireless communication system is provided. The method includes, if the UE performs a handover from a macro base station of a macro cell to the femto base station, transmitting a path switch request message, which includes a serving gateway relocation Information Element (IE), to a Mobility Management Entity (MME) of the macro cell, in order to request a switching from an existing session of the UE to a new session managed by the femto base station, and if the existing session of the UE is switched to the new session in response to the path switch request message, receiving a path switch approval message from the MME, wherein the serving gateway relocation IE includes information requesting relocation of a serving gateway of the UE to a femto serving gateway within the femto cell.

In accordance with yet another aspect of the present invention, a wireless communication system for switching a session of a UE is provided. The wireless communication system includes the UE, a macro base station and a femto base station for performing a handover for the UE according to movement of the UE from a macro cell to a femto cell, and a Mobility Management Entity (MME) for, if the UE performs a handover from the macro base station to the femto base station, receiving a path switch request message, which includes a serving gateway relocation Information Element (IE) for requesting a switching from an existing session of the UE to a new session managed by the femto base station, from the femto base station, and in response to the path switch request message, switching the existing session of the UE to the new session and transmitting a path switch approval message to the femto base station, wherein the serving gateway relocation IE includes information requesting relocation of a serving gateway of the UE to a femto serving gateway within the femto cell.

In accordance with still another aspect of the present invention, a wireless communication system for switching a session of a UE is provided. The wireless communication system includes an MME for managing a mobility of the UE within a macro cell, and a femto base station for, if the UE performs a handover from a macro base station of the macro cell to the femto base station of a femto cell, transmitting a path switch request message, which includes a serving gateway relocation Information Element (IE), to the MME, in order to request a switching from an existing session of the UE to a new session managed by the femto base station, and, if the existing session of the UE is switched to the new session in response to the path switch request message, receiving a path switch approval message from the MME when the existing session of the UE is switched to the new session in response to the path switch request message, wherein the serving gateway relocation IE includes information requesting relocation of a serving gateway of the UE to a femto serving gateway within the femto cell.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose an apparatus and method for switching a session used in a macro cell to a session in a femto cell when a User Equipment (UE) that is receiving a packet communication service through a macro base station has moved into the femto cell in a wireless communication system, so that the UE can effectively use the packet communication service. This method is called "Local Internet Protocol (IP) Access" or "Local BreakOut (LBO)".

LBO methods within a femto cell include a method in which a UE enters a femto cell in an idle state and generates a new session (i.e., LBO session), and a method in which a UE enters a femto cell in a state maintaining the service, which the UE has received from a macro base station, and additionally generates an LBO session in the femto cell in order to receive the service through the macro base station and the macro system.

From among the LBO methods, an exemplary method in which a UE enters a femto cell in an idle state and generates an LBO session will be described hereinafter with reference to FIG. 1.

Figure 1:
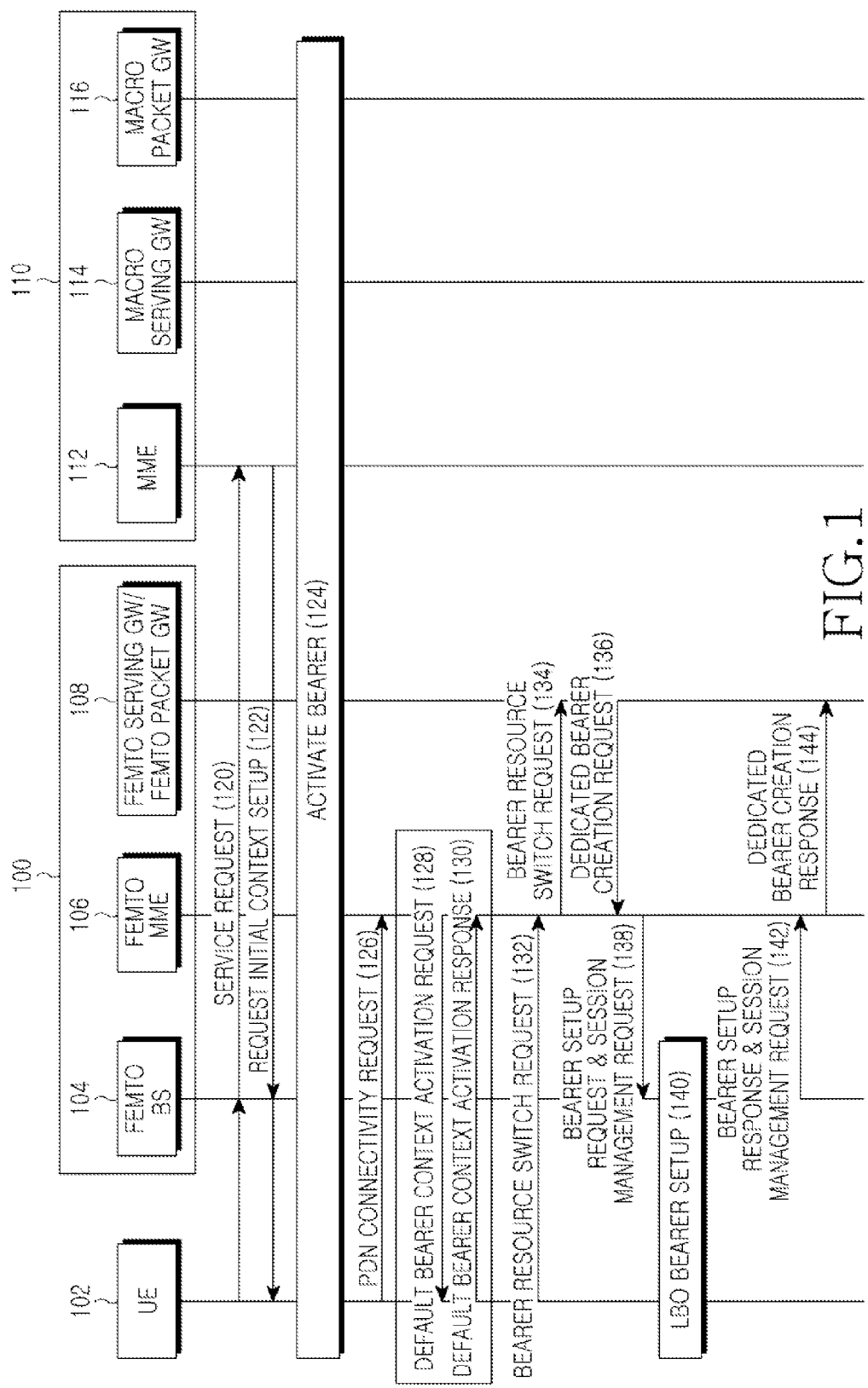
FIG. 1 illustrates a method in which a User Equipment (UE) enters a femto cell in an idle state and generates a Local BreakOut (LBO) session according to an exemplary embodiment of the present invention.

FIG. 1 illustrates a method in which a UE enters a femto cell in an idle state and generates an LBO session according to an exemplary embodiment of the present invention.

Referring to FIG. 1, a macro cell 110 includes a Mobility Management Entity (MME) 112 for managing session and context of a UE, a macro serving gateway 114, and a macro packet gateway 116. Further, a femto cell 100 includes a femto base station 104, a femto MME 106, and a femto serving gateway/femto packet gateway 108.

When a UE 102 moves from the macro cell 110 to the femto cell 100, the UE 102 transmits a service request message to the MME 112 of the macro cell 110 through the femto base station 104 in step 120 in order to perform a communication in the femto cell 100. In step 122, the MME 112 transmits an initial context setup request message to the femto base station 104 in order to activate the context of the UE 102. The initial context setup request message is transmitted to the UE 102 through the femto base station 104.

When the femto base station 104 has received the initial context setup request message, the femto base station 104 activates all bearers on the context of the UE 102 in step 124. When all the bearers have been activated, the UE 102 transmits a Packet Data Network (PDN) connectivity request message to the femto MME 106 in step 126.

In step 128, the femto MME 106 transmits a default bearer context activation request message for activating the default bearer to the UE 102. In step 130, the UE 102 transmits a default bearer context activation response message to the femto MME 106, so as to notify that the default bearer has been activated.

In order to create an LBO session, the UE 102 transmits a bearer resource modification request message to the femto MME 106 in step 132. The femto MME 106 transmits the bearer resource modification request message to the femto serving gateway/femto packet gateway 108 in step 134, and receives a dedicated bearer creation request message from the femto serving gateway/femto packet gateway 108 in step 136.

Although the femto serving gateway/femto packet gateway 108 is illustrated as a single integral unit in FIG. 1, it goes without saying that the femto serving gateway and the femto packet gateway can be configured as physically separate devices.

In step 138, the femto MME 106 transmits a bearer setup request message and a session management request message to the femto base station 104. In step 140, the femto base station 104 sets an LBO bearer with the UE 102. When the LBO bearer has been completely set, the femto base station 104 transmits a bearer setup response message and a session management response message to the femto MME 106 in step 142. In step 144, the femto MME 106 transmits a dedicated bearer creation response message to the femto serving gateway/femto packet gateway 108.

When the process described above has been completed, the UE 102 can efficiently perform a data packet communication within the femto cell 100 through the newly created LBO session.

However, according to an increase in the sessions within the femto cell, the method described above additionally requires a function for session management within the femto cell. That is, an MME that manages a session and a context of a UE should be additionally included in the femto cell as described above. However, the addition of an MME within the femto cell is not advantageous in view of efficiency and security.

According to an exemplary embodiment of the present invention, an apparatus and method for session switching of a UE are provided. According to an exemplary implementation, the UE is able to more effectively perform data packet transmission/reception in a femto cell when the UE has moved into the femto cell.

According to exemplary embodiments, a structure of a macro cell and a femto cell in a wireless communication system will be described first with reference to FIG. 2.

Figure 2:
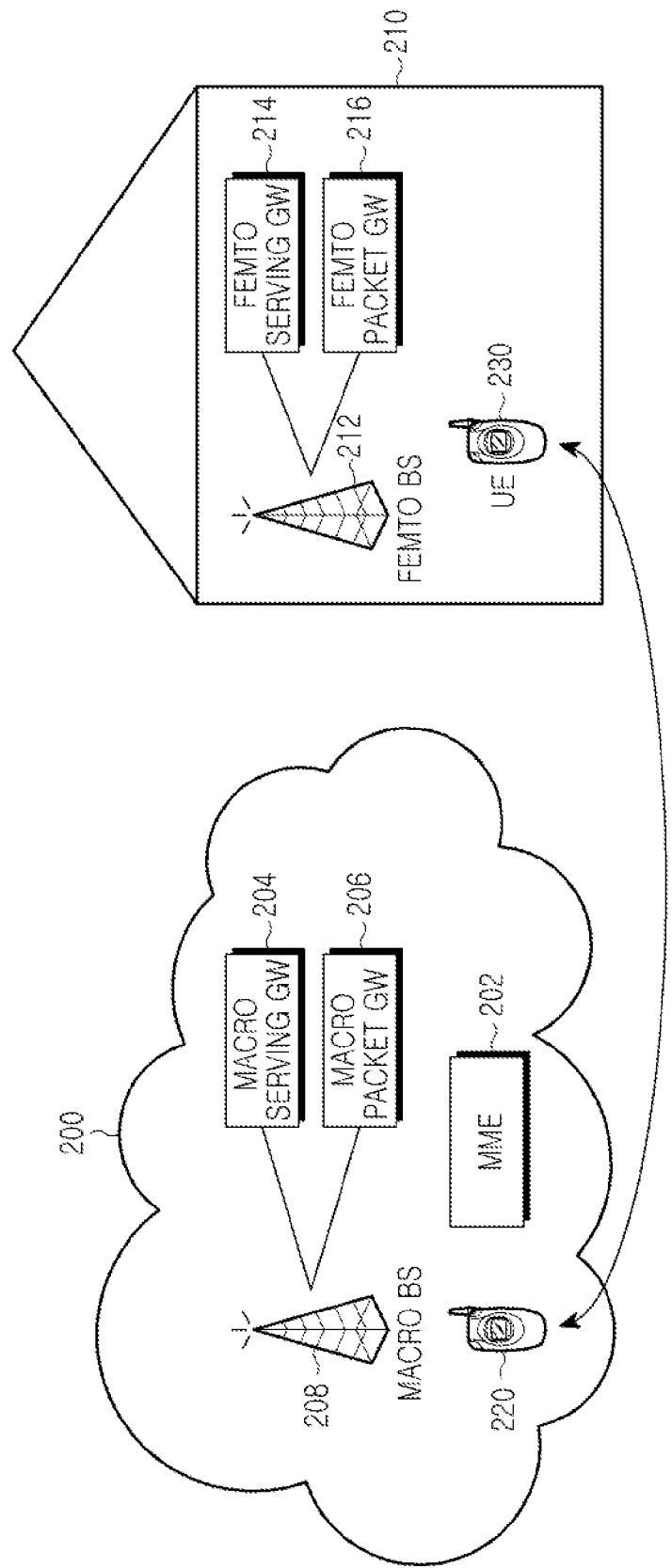
FIG. 2 is a block diagram schematically illustrating a structure of a macro cell and a femto cell in a wireless communication system according to an exemplary embodiment of the present invention.

FIG. 2 is a block diagram schematically illustrating a structure of a macro cell and a femto cell in a wireless communication system according to an exemplary embodiment of the present invention.

Referring to FIG. 2, a wireless communication system includes a macro cell 200 and a femto cell 210. A UE 220 located within the macro cell 200 may move into the femto cell 210 in an idle state or an active state. A UE 230 having moved into the femto cell 210 in an active state performs a handover from the macro base station 208 of the macro cell 200 to the femto base station 212 of the femto cell 210, and then performs uplink and downlink packet transmission/reception with the femto base station 212.

In order to switch the session of the UE 230 to an LBO session, the femto base station 212 transmits a path switch request message for the data packet transmission path to the MME 202 within the macro cell 200. According to an exemplary embodiment of the present invention, the path switch request message includes a serving gateway relocation flag and an Internet Protocol (IP) address of the serving gateway to be relocated. This is in order to notify the UE MME 102 that a relocation of the serving gateway is necessary (serving gateway relocation flag) and that the serving gateway to be relocated is the femto serving gateway 214, so as to switch the transmission path of the data packet to the femto cell 210. That is, the path switch request message is transmitted in order to switch the data packet communication in the macro cell 200 to a data packet communication in the femto cell 210.

Hereinafter, the path switch request message will be described in more detail.

According to an exemplary embodiment, the path switch request message includes a packet gateway relocation flag and an IP address of the packet gateway, together with the serving gateway relocation flag and an IP address of the serving gateway. This is because, when the UE 230 has performed a handover to the femto base station 212, the macro serving gateway 204 and the macro packet gateway 206 should be switched to the femto serving gateway 214 and the femto packet gateway 216.

When the femto serving gateway 214 and the femto packet gateway 216 have been configured as a single unit, the femto serving gateway 214 and the femto packet gateway 216 have the same IP address. Further, even when the femto serving gateway 214 and the femto packet gateway 216 are configured as separate units, it is possible to infer the IP address of the femto packet gateway 216 from the IP address of the femto serving gateway 214. This is because it is usual that an IP address of a packet gateway is set to be similar to an IP address of a serving gateway.

Therefore, when the serving gateway is changed, the packet gateway may be automatically identified and changed. Accordingly, an exemplary embodiment in which the path switch request message includes a relocation flag of the serving gateway and an IP address of the serving gateway without a relocation flag of the packet gateway and an IP address of the packet gateway, will be described hereinafter.

Table 1 below shows a format of a path switch request message according to an exemplary embodiment of the present invention.

TABLE 1

IE/Group Name
Message Type
eNB UE S1AP ID
E-RAB To Be Switched in Downlink List
> E-RABs Switched in Downlink Item IEs
>> E-RAB ID
>> Transport layer address
>> GTP-TEID
Source MME UE S1AP ID
E-UTRAN CGI
TAI
UE Security Capabilities
SGW Relocation IE
> SGW Relocation flag
> SGW IP address As shown in Table 1, the path switch request message has a format in which a Serving GateWay (SGW) relocation Information Element (IE) has been added to conventional IEs of the path switch request message. The conventional IEs include an IE of "Message Type", an IE of "eNode B User Equipment S1 Application Protocol Identifier (eNB UE S1AP ID)", an IE of "E-RAB to be switched in a downlink list (E-RAB)", an IE of "Source Mobility Management Entity User Equipment S1 Application Protocol Identifier (Source MME UE S1AP ID)", an IE of "Evolved-Universal Terrestrial Radio Access Cell Global (E-UTRAN CGI)", an IE of "International Atomic Time (TAI)", and an IE of "User Equipment (UE) Security Capabilities".

The serving gateway relocation IE includes a Serving GateWay relocation flag (SGW relocation flag) and a Serving GateWay IP address (SGW IP address).

The SGW relocation flag indicates whether to relocate the serving gateway, and the SGW IP address indicates the IP address of the serving gateway to be switched when the relocation of the serving gateway is necessary.

The relocation of the serving gateway is necessary when the UE 230 performs a handover to the femto base station 212 or the address of a destination for uplink data transmitted from the UE 230 is changed. In an exemplary implementation, since the UE 230 has performed a handover to the femto base station 212, the IP address of the serving gateway is set as the IP address of the femto serving gateway 214.

Meanwhile, when the femto serving gateway 214 uses the same IP address as that of the femto base station 212, the IP address of the serving gateway may be set to be the same as the transport layer address included in the conventional path switch request message.

When the switching of the data packet transmission path is completed through the transmission of the path switch request message as described above, the session (macro session), which the UE 230 has used within the macro cell 200, is switched to the LBO session. Then, the UE 230 can access an Internet network through the LBO session within the femto cell 210 without passing through a donor network, or can perform a direct data packet communication with a home appliance.

Hereinafter, exemplary network nodes of the macro cell 200 and the femto cell 210 will be described in more detail.

First, the macro cell 200 includes an MME 202, a macro serving gateway 204, a macro packet gateway 206, and a macro base station 208.

The MME 202 manages a session and context information of the UE 220, and performs a network setup for supporting the mobility of the UE 220. Further, the MME 202 provides the context information for communication of the UE 220 to the network nodes requiring the information.

In order to determine the network node, to which the data packet from the UE 230 has been transmitted, the MME 202 determines if the UE 230 performs a communication within the femto cell 210, by using an Access Point Name (APN). An APN is a network identifier for identifying the network having transmitted the data packet.

When the MME 202 has determined that the UE 230 does not perform a communication within the femto cell 210, the MME 202 selects a packet gateway according to the APN information. Further, when the MME 202 has determined that the UE 230 performs a communication within the femto cell 210, the MME 202 may perform the following exemplary operation.

The MME 202 receives a PDN connectivity request message from the UE 230 having moved into the femto cell 210 and receives a path switch request message from the femto base station 212, thereby processing the session switching for the UE 230.

As described above, the path switch request message includes a serving gateway relocation flag and an IP address of the serving gateway. Therefore, the MME 202 determines, by using the serving gateway relocation flag, whether to switch the serving gateway used by the UE 230. Further, when the MME 202 has determined that the serving gateway should be switched, the MME 202 identifies the IP address of the serving gateway and switches the serving gateway for the UE 230 to a serving gateway corresponding to the IP address of the identified serving gateway.

According to an exemplary embodiment, since the UE 230 has moved from the macro cell 200 to the femto cell 210, the serving gateway relocation flag is set to have a value indicating the relocation of the serving gateway, and the IP address of the serving gateway is set to be the IP address of the femto serving gateway 214. As described above, the determination of whether it is necessary to relocate the serving gateway is performed by the femto base station 212, which will be described later in more detail.

Through execution of the relocation of the serving gateway, the serving gateway used in the data packet communication is switched from the macro serving gateway 204 to the femto serving gateway 214. Further, since it is possible to identify the femto packet gateway 216 by using the IP address of the femto serving gateway 214, the packet gateway is also switched from the macro packet gateway 206 to the femto packet gateway 216.

Now, an exemplary operation for relocation of the serving gateway is described below.

The MME 202 transmits a bearer creation request message to the femto serving gateway 214. Further, when the MME 202 has received a bearer creation response message from the femto serving gateway 214, the MME 202 determines that the creation of the LBO bearer has been completed, and updates the context information of the UE 230. At this time, the updated context information of the UE 230 may include an IP address of the UE 230, serving gateway and packet gateway information, and APN information. Meanwhile, the MME 202 may receive a message, which requests transmission of the context information of the UE 230 to the femto base station 212, from the UE 230. Then, the MME 202 transmits the context information of the UE 230 to the femto base station 212 after the switching of the UE 230 to the LBO session has been completed.

In general, the macro serving gateway 204 serves as an anchor point for managing the mobility of the UE 230, and performs packet routing and forwarding. Further, the macro serving gateway 204 buffers a downlink packet and initializes the network trigger service request procedure. Especially, when the macro session is switched to the LBO session. That is, when the IP address of the UE 230 is changed to the IP address newly allocated within the femto cell 210 and the bearer setup between the femto base station 212 and the torque signal compensation unit 130 has been completed, the macro serving gateway 204 indicates an end marker in the data packet transmitted to the UE 230. Further, the macro serving gateway 204 terminates the data packet transmission into the macro cell 200.

The macro packet gateway 206 performs a Quality of Service (QoS) marking on the data packets transmitted from the macro serving gateway 204 to the UE 230, that is, on the data packets up to the data packet in which the end marker is indicated by the macro serving gateway 204.

Further, when the UE 220 has moved into the femto cell 210, the macro base station 208 performs a handover process together with the UE 230 having moved into the femto cell 210 and the femto base station 212. Thereafter, the macro base station 208 transmits the data packets received through the macro serving gateway 204 to the UE 220 up to the data packet in which the end marker is indicated.

The femto cell 210 includes the femto base station 212, the femto serving gateway 214, and the femto packet gateway 216.

When the femto base station 212 has identified the entrance of the UE 230 into the macro cell 200 according to the handover processing of the UE 230, the femto base station 212 determines that it is necessary to relocate the serving gateway. Otherwise, based on whether a destination of uplink data transmitted from the UE 230 within the femto cell 210 is a donor network or if uplink data uses an existing data path, the femto base station 212 may determine if it is necessary to relocate the serving gateway.

When the femto base station 212 determines that it is necessary to relocate the serving gateway, the femto base station 212 transmits a path switch request message including a serving gateway relocation IE to the MME 202. Further, when the femto base station 212 has received a path switch request approval message and the context information of the UE 230 from the MME 202, the femto base station 212 performs the LBO bearer setup with the UE 230, and transmits a PDN connectivity completion message to the MME 202. Thereafter, the femto base station 212 allocates an IP address generated by the femto packet gateway 216 to the UE 230.

When the femto serving gateway 214 has received a bearer creation request message from the MME 202, the femto serving gateway 214 transmits the bearer creation request message to the femto packet gateway 216. Further, when the femto serving gateway 214 has received a bearer creation response message from the femto packet gateway 216, the femto serving gateway 214 transmits the bearer creation response message to the MME 202.

When the femto packet gateway 216 has received a PDN connectivity request message from the UE 230, the femto packet gateway 216 generates a new IP address to be used within the femto cell. Further, after a new IP address is allocated to the UE 230, the femto packet gateway 216 performs a QoS marking for the data packet transmitted to the UE 230.

A wireless communication system including the femto cell 210 and the macro cell 200 having the construction as described above is advantageous in that a UE can efficiently use a packet communication service without an interruption in the communication even when the UE moves in an active state.

Although the macro serving gateway 204, the macro packet gateway 206, the femto serving gateway 214, and the femto packet gateway 216 are illustrated as separate devices in FIG. 2, they may be configured as a single integral device.

Hereinafter, an exemplary session switch process of a UE is described with reference to FIG. 3. For better understanding, the following description of FIG. 3 is based on the network nodes of the macro cell and the femto cell of FIG. 2.

Figure 3:
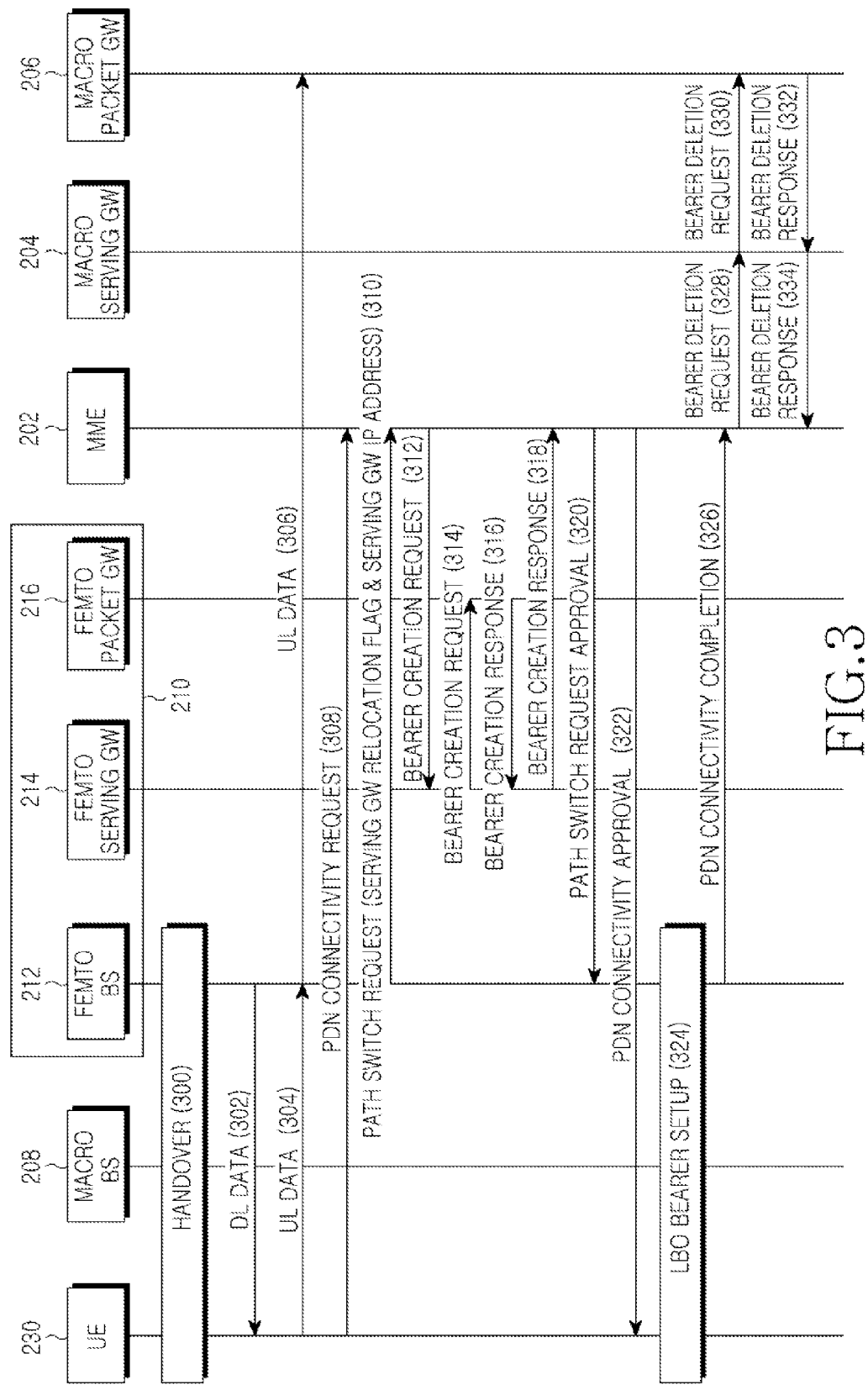
FIG. 3 is a signal flow diagram illustrating a process of switching a macro session of a UE to an LBO session according to an exemplary embodiment of the present invention.

FIG. 3 is a signal flow diagram illustrating a process of switching a macro session of a UE to an LBO session according to an exemplary embodiment of the present invention.

Referring to FIG. 3, in step 300, when the UE 230 moves from the macro cell to the femto cell 210, the UE 230 performs a process to handover to the femto base station 212 from the macro base station 208. When the handover process has been completed, the femto base station 212 transmits downlink data to the UE 230 in step 302. In step 304, the UE 230 transmits uplink data to the femto base station 212. In step 306, the uplink data is transmitted through the previous data path, that is, to the macro cell in which the UE 230 was previously located.

According to the execution of the handover process in step 300, the femto base station 212 determines that it is necessary to relocate the serving gateway. Further, the femto base station 212 can determine if it is necessary to relocate the serving gateway by identifying the destination of the uplink data in step 304. Although the uplink data is transmitted through the existing data path in FIG. 3, it goes without saying that the destination of the uplink data may be changed to various other locations.

Meanwhile, according to an exemplary implementation, after completion of steps 302 to 306, a session switch process as follows is performed in order to minimize the data loss and delay.

In step 308, the UE 230 transmits a PDN connectivity request message to the MME 202. Although not shown in FIG. 3, simultaneously with the transmission of the PDN connectivity request message, the UE 230 may transmit a context information request message, which requests transmission of the context information to the femto base station 212, to the MME 202.

Further, in step 310, the femto base station 212 transmits a path switch request message to the MME 202. According to an exemplary embodiment of the present invention, the path switch request message includes a serving gateway relocation IE for switching the transmission path of the data packet, that is, a serving gateway relocation flag and an IP address of the serving gateway.

The path switch request message may be transmitted earlier than or simultaneously with the PDN connectivity request message. That is, it is possible to variously change the order of transmission of the path switch request message and the PDN connectivity request message.

In step 312, the MME 202 recognizes, from the serving gateway relocation flag of the serving gateway relocation IE, that it is necessary to relocate the serving gateway, and transmits a bearer creation request message to the femto serving gateway 214 having the same IP address as the IP address of the serving gateway. In step 314, the femto serving gateway 214 transmits the bearer creation request message to the femto packet gateway 216. Thereafter, when the femto serving gateway 214 has received a bearer creation response message from the femto packet gateway 216 in step 316, the femto serving gateway 214 transmits the bearer creation response message to the MME 202 in step 318.

The MME 202 identifies that the creation of the LBO bearer has been completed, updates the context information of the UE 230, and transmits a path switch request approval message to the femto base station 212 in step 320. Further, the MME 202 transmits the updated context information of the UE 230 to the femto base station 212. Thereafter, in step 322, the MME 202 transmits a PDN connectivity approval message to the UE 230.

Likewise in steps 308 and 310, it is possible to variously change the order of transmission of the path switch request message and the PDN connectivity request message according to embodiments of the present invention.

In response to the path switch request message and the PDN connectivity request message, the UE 230 and the femto base station 212 perform an LBO bearer setup process in step 324. When the LBO bearer setup process is completed, the femto base station 212 transmits a PDN connectivity completion message to the MME 202 in step 326.

In step 328, the MME 202 transmits a bearer deletion request message to the macro serving gateway 204 located within the macro cell 200. Further, the macro serving gateway 204 transmits the bearer deletion request message to the macro packet gateway 206 in step 330, and then receives a bearer deletion response message from the macro packet gateway 206 in step 332. Then, in step 334, the macro serving gateway 204 transmits the bearer deletion response message to the MME 202, thereby notifying that the bearer having been used in the macro cell 200 has been deleted.

According to an exemplary embodiment as described above, it is possible to more easily switch the session of the UE to an LBO session. Therefore, a UE having received a packet communication service in a macro cell can receive a data packet service through an efficient transmission path even after the UE moves into a femto cell.

Hereinafter, an exemplary process of an MME within a macro cell as shown in FIG. 2 will be described in more detail with reference to FIG. 4.

Figure 4:
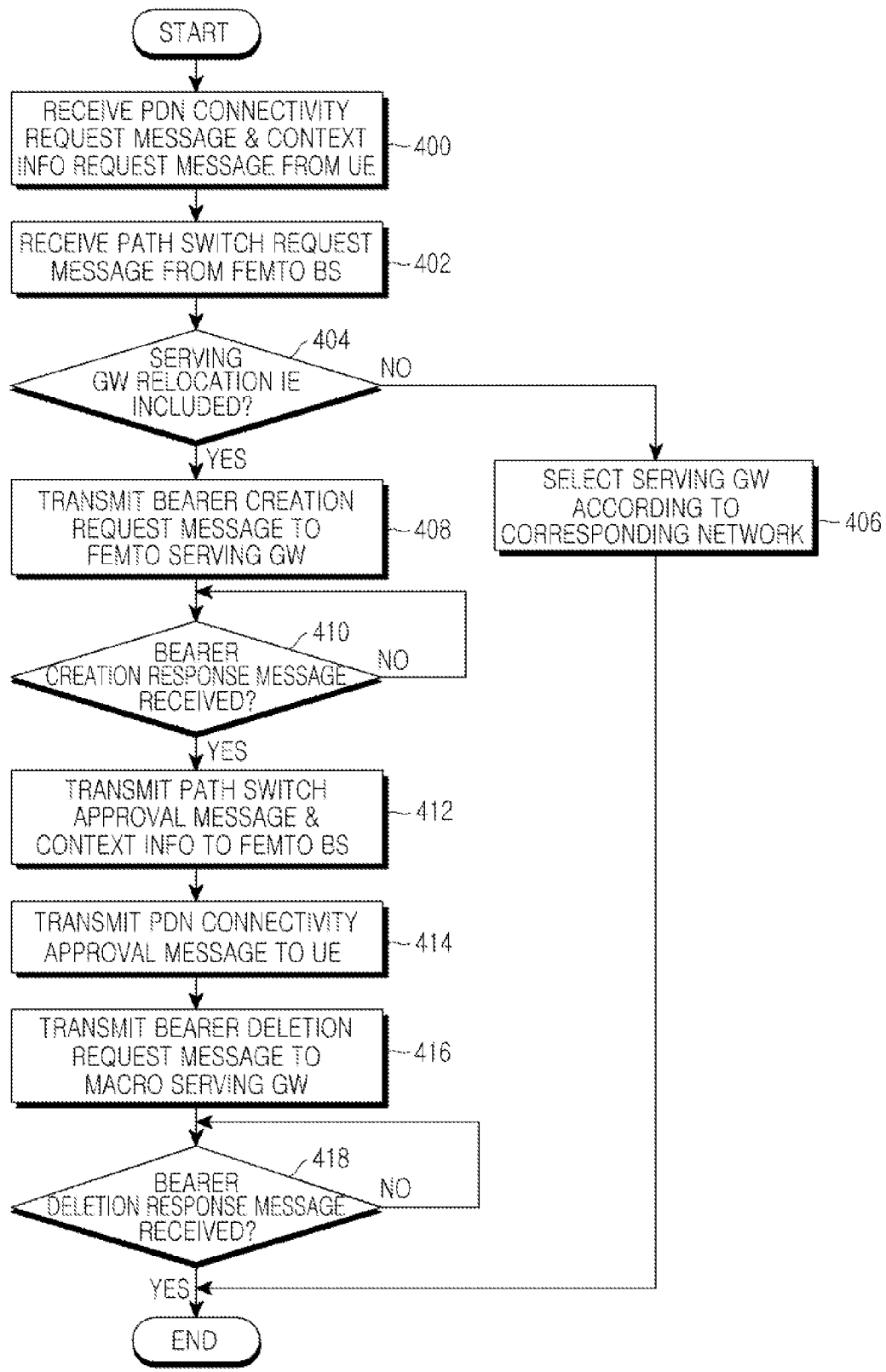
FIG. 4 is a flowchart illustrating an operation of an MME according to an exemplary embodiment of the present invention.

FIG. 4 is a flowchart illustrating an operation of an MME according to an exemplary embodiment of the present invention.

Referring to FIG. 4, in step 400, the MME 102 receives a PDN connectivity message and a context information request message from the UE 230. In step 402, the MME 202 receives a path switch request message from the femto base station 212.

In step 404, the MME 202 determines if the path switch request message includes a serving gateway relocation IE. As described above, the serving gateway relocation IE includes a serving gateway relocation flag and an IP address of the serving gateway. If it is determined in step 404 that the path switch request message does not include the serving gateway relocation IE, the MME 202 selects a serving gateway according to a corresponding network in step 406 and then terminates the procedure.

On the other hand, if it is determined in step 404 that the path switch request message includes the serving gateway relocation IE, the MME 202 transmits a bearer creation request message to the femto serving gateway 214 based on the serving gateway relocation IE in step 408. In step 410, the MME 202 determines if a bearer creation response message from the femto serving gateway 214 is received.

If it is determined in step 410 that the bearer creation response message has been received, the MME 202 updates the context information of the UE 230. On the other hand, if it is determined in step 410 that the bearer creation response message has not been received, the MME 202 continues executing step 410.

In step 412, the MME 202 transmits a path switch approval message and the updated context information of the UE 230 to the femto base station 212, thereby notifying that the switching to the LBO session has been approved. In step 414, the MME 202 transmits a PDN connectivity approval message to the UE 230, thereby notifying that the switching to the LBO session has been approved.

In step 416, the MME 202 transmits a bearer deletion request message to the femto serving gateway 214. Then, the femto serving gateway 214 transmits the bearer deletion request message to the femto packet gateway 216, thereby indicating deletion of the session of the macro cell. Further, when the femto serving gateway 214 has received a macro deletion response message from the femto packet gateway 216, the femto serving gateway 214 transmits a macro deletion response message to the MME 202.

In step 418, the MME 202 determines if the bearer deletion response message from the macro serving gateway 114 has been received. If it is determined in step 418 that the bearer deletion response message from the macro serving gateway 114 has not been received, the MME 202 continues executing step 418. On the other hand, if it is determined in step 418 that the bearer deletion response message from the macro serving gateway 114 has been received, the MME 202 identifies that the switching process of the macro session to the LBO session is completed, and terminates all the processes. Thereafter, data packets for the UE 230 are transmitted through the LBO session connected through the femto packet gateway.

Next, an exemplary operation of a femto base station will be described in more detail.

Figure 5:
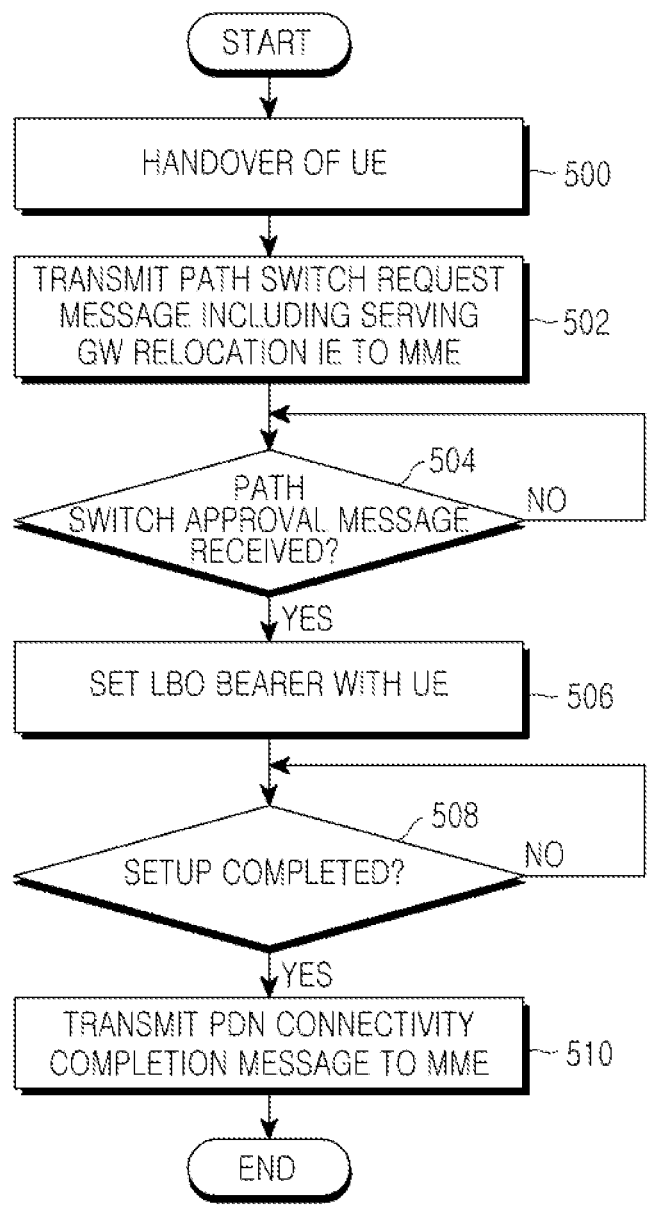
FIG. 5 is a flowchart illustrating an operation of a femto base station according to an exemplary embodiment of the present invention.

FIG. 5 is a flowchart illustrating an operation of a femto base station according to an exemplary embodiment of the present invention.

In step 500, the femto base station 212 performs a handover process with the UE 230. Although not shown in FIG. 5, the femto base station 212 determines if uplink data transmitted from the UE 230 should be used only within the femto cell 210. When the uplink data should be used only within the femto cell 210, the femto base station 212 proceeds to step 502 in order to request a serving gateway relocation. Otherwise, the femto base station 212 determines that the serving gateway relocation is unnecessary, and transmits the uplink data to the macro serving gateway 204.

In step 502, the femto base station 212 transmits a path switch request message including a serving gateway relocation IE to the MME 202. In step 504, the femto base station 212 determines if a path switch approval message from the femto base station 212 has been received.

If it is determined in step 504 that a path switch approval message from the femto base station 212 has been received, the femto base station 212 proceeds to step 506, in which the femto base station 212 sets an LBO bearer with the UE 230. Then, through the path switch approval message, the femto base station 212 can receive the context information of the UE 230 from the MME 202. On the other hand, if it is determined in step 504 that a path switch approval message from the femto base station 212 has not been received, the femto base station 212 continues executing step 504.

In step 508, it is determined whether the LBO bearer setup with the UE has been completed. If it is determined in step 508 that the LBO bearer setup with the UE 230 has been completed, the femto base station 212 proceeds to step 510 wherein the femto base station 212 transmits a PDN connectivity completion message to the MME 202. On the other hand, if it is determined in step 508 that the LBO bearer setup with the UE 230 has not been completed, the femto base station 212 continues executing step 508.

According to exemplary embodiments of the present invention as described above, when a UE has moved from a macro cell to a femto cell, a femto base station requests relocation of the serving gateway by transmitting a serving gateway relocation IE to the MME of the macro cell, so as to enable a more efficient setup of the transmission path of a data packet. Therefore, a UE within a femto cell can directly communicate with a home appliance without passing through a donor network or access an Internet network through an efficient transmission path.

Also, according to exemplary embodiments of the present invention, a UE can simultaneously receive a data packet transmitted from a macro cell and a data packet transmitted from a femto cell within the femto cell. That is, the UE may simultaneously have two PDN connections for communications with a macro base station and a femto base station. Specifically, the UE may simultaneously have both a PDN connection through a PDN gateway existing in the femto cell and a PDN connection through a PDN gateway existing in the macro cell through the femto base station.

As described above, multiple PDN connections may exist on each network, and each PDN connection can be identified by APN information and an IP address of a UE. Therefore, the context information of an MME and a UE stores PDN connection information for each PDN connection.

In general, the PDN connection information of the MME includes IEs as shown in Table 2 below.

TABLE 2

APN in Use
APN Subscribed

TABLE 2-continued

PDN Type
IP Address(es)
VPLMN Address Allowed
PDN GW Address in Use (control plane)
PDN GW TEID for S5/S8 (control plane)
MS Info Change Reporting Action
EPSs subscribed QoS profile
Subscribed APN-AMBR
APN-AMBR
PDN GW GRE Key for uplink traffic (user plane)
Default bearer That is, the context information according to the PDN connection of the MME includes an IE of "APN in Use", which indicates the APN being used according to the current PDN connection, an IE of "APN Subscribed", which indicates if the APN has been subscribed so that the APN can be used, an IE of "PDN Type", which indicates if the IP address system used according to the PDN connection is IPv4 or IPv6, an IE of "IP Address(es)", which indicates IP addresses of UEs managed by the MME, an IE of "VPLMN Address Allowed", which indicates an address of an allowed Visited Public Land Mobile Network (VPLMN), an IE of "PDN GW Address in Use (control plane)", which indicates an address of a PDN gateway used in a control plane, an IE of "PDN GW TEID for S5/S8 (control plane)", which indicates a PDN gateway Terminal Equipment Identifier (TEID) in the control plane for S5/S8 indicating the interface type between the PDN gateway and the serving gateway, an IE of "MS info change Reporting Action", which indicates action information according to the information change report of the UE, an IE of "EPS subscribed QoS profile", which indicates an Evolved Packet System (EPS) subscribed QoS profile including a bearer level QoS parameter value for APN-AMBR and a default bearer of the APN, an IE of "Subscribed APN-AMBR", an IE of "APN-AMBR", an IE of "PDN GW GRE Key for uplink traffic (user plane)", which indicates a PDN gateway Generic Routing Encapsulation (GRE) key for an uplink traffic in an area in which the UE has been located, and an IE of "default bearer".

Further, as shown in Table 3 below, the context information according to the PDN connection of the UE includes an IE of "APN in Use", which indicates the APN being used according to the current PDN connection, an IE of "APN-AMBR", which indicates an Aggregate Maximum Bit Rate (APN-AMBR), which is a parameter stored in the corresponding APN, an IE of "IP address(es)" of the UE, and an IE of "default bearer".

TABLE 3

APN in Use
APN-AMBR
IP Address(es)
Default Bearer

However, the conventional context information according to the PDN connection of the MME and the UE as described above does not include any information, by which it is possible to determine if the data packet transmitted to the UE is transmitted from a macro serving gateway or a femto serving gateway. That is, with only Tables 1 and 2, it is impossible for a UE to identify the serving gateway, through which the current data packet is transmitted.

Of course, the specific context information for each UE includes serving gateway information. However, this information indicates only the macro serving gateway information.

Therefore, an exemplary embodiment of the present invention proposes a method of including an IP address of each femto serving gateway in context information according to a PDN connection of a UE and an MME, so that the data packets transmitted in the macro cell and the femto cell can be managed while being discriminated from each other.

As an example with reference to FIG. 3 described above, in step 308, the MME 202 receives the PDN connectivity request message and then generates context information according to the PDN connection. Further, the UE 230 transmits the PDN connectivity request message, and generates context information according to the PDN connection in step 322 when the UE has received the PDN connection approval message.

In more detail, the context information according to the PDN connection generated by the MME 202 after receiving the PDN connectivity request message includes IEs as shown in Table 4 below.

TABLE 4

APN in Use
APN Subscribed
PDN Type
IP Address(es)
VPLMN Address Allowed
PDN GW Address in Use (control plane)
Serving GW Address in Use (user plane)
PDN GW TEID for S5/S8 (control plane)
MS Info Change Reporting Action
EPS subscribed QoS profile
Subscribed APN-AMBR
APN-AMBR
PDN GW GRE Key for uplink traffic (user plane)
Default bearer As shown in Table 4, the context information according to the PDN connection of the MME 202 includes an IE of "APN in Use", which indicates the APN being used according to the current PDN connection, an IE of "APN Subscribed", which indicates if the APN has been subscribed so that the APN can be used, an IE of "PDN Type", which indicates if the IP address system used according to the PDN connection is IPv4 or IPv6, an IE of "IP Address(es)", which indicates IP addresses of UEs managed by the MME, an IE of "VPLMN Address Allowed", which indicates an address of an allowed Visited Public Land Mobile Network (VPLMN), an IE of "PDN GW Address in Use (control plane)", which indicates an address of a PDN gateway used in a control plane, an IE of "Serving GW Address in Use (user plane)", which indicates an address of a femto serving gateway used in a user plane, an IE of "PDN GW TEID for S5/S8 (control plane)", which indicates a PDN gateway Terminal Equipment Identifier (TEID) in the control plane for S5/S8 indicating the interface type between the PDN gateway and the serving gateway, an IE of "MS info change Reporting Action", which indicates action information according to the information change report of the UE, an IE of "EPS subscribed QoS profile", which indicates an Evolved Packet System (EPS) subscribed QoS profile including a bearer level QoS parameter value for APN-AMBR and a default bearer of the APN, an IE of "Subscribed APN-AMBR", an IE of "APN-AMBR", an IE of "PDN GW GRE Key for uplink traffic (user plane)", which indicates a PDN gateway Generic Routing Encapsulation (GRE) key for an uplink traffic in an area in which the UE has been located, and an IE of "default bearer".

Further, the context information according to the PDN connection generated by a UE after receiving a PDN connectivity request message includes IEs as shown in Table 5 below.

TABLE 5

APN in Use
APN-AMBR
IP Address(es)
Serving GW Address in Use (user plane)
Default Bearer As shown in Table 5, the context information according to the PDN connection of the UE 230 includes an IE of "APN in Use", which indicates the APN being used according to the current PDN connection, an IE of "APN-AMBR", which indicates an Aggregate Maximum Bit Rate (APN-AMBR), which is a parameter stored in the corresponding APN, an IE of "IP address(es)" of the UE, an IE of "Serving GW Address in Use (user plane)", which indicates an address of a femto serving gateway used in a user plane, and an IE of "default bearer".

However, the MME 202 and the UE 230 cannot know the IP address of the femto serving gateway 214 at the time point of creating their own context information.

Therefore, upon receiving the PDN connectivity request message in step 308, the MME 202 arranges a storage (entry) space for storing the IP address of the femto serving gateway 214 within its own context information. Further, the UE 230 also arranges, after transmitting the PDN connectivity request message, a storage (entry) space for storing the IP address of the femto serving gateway 214 within its own context information.

That is, each of the MME 202 and the UE 230 arranges a storage space (i.e. sets an empty item) for storing the IP address of the femto serving gateway 214 within the context information according to the PDN connection.

Thereafter, when the MME 202 has received a path switch request message including the IP address of the femto serving gateway 214 from the femto base station 212, the MME 202 stores the IP address of the femto serving gateway 214 in the set empty item.

Further, when the UE 230 has received a PDN connectivity approval message from the MME 202, the UE 230 receives the IP address of the femto serving gateway 214 from femto base station 212, and stores the IP address of the femto serving gateway 214 in the empty item arranged in its own context information.

As a result, the UE 230 can perform exact packet transmission and reception while discriminating between a data packet transmitted through the femto serving gateway 214 and a data packet transmitted through the macro serving gateway 204 in the femto cell 210.

According to exemplary embodiments of the present invention, a UE can directly communicate with a home appliance within a femto cell, and can directly access an Internet network in a femto cell without passing through a donor network. Further, it is possible to effectively switch the session of a UE having moved into a femto cell during communication from a base station of a macro cell to a base station of a femto cell, so that the UE can move from the macro cell to the femto cell without communication interruption. Therefore, according to exemplary embodiments of the present invention, the UE can more effectively perform data packet transmission and reception within a femto cell.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for switching a session of a User Equipment (UE) by a Mobility Management Entity (MME) in a wireless communication system, the method comprising:
    if the UE performs a handover from a macro base station of a macro cell to a femto base station of a femto cell, receiving a path switch request message, which includes a serving gateway relocation Information Element (IE) for requesting a switching from an existing session of the UE to a new session managed by the femto base station, from the femto base station; and
    switching the existing session of the UE to the new session;
    if a packet data network connectivity request message has been received from the UE after completing the handover, generating context information of the UE for the new session, the context information including an Internet Protocol (IP) address of the femto serving gateway detected from the serving gateway relocation IE; and
    transmitting a path switch approval message and the context information to the femto base station,
    wherein the serving gateway relocation IE comprises information requesting relocation of a serving gateway of the UE to a femto serving gateway within the femto cell.

2. The method of claim 1, wherein the serving gateway relocation IE comprises a serving gateway relocation flag indicating that it is necessary to relocate the serving gateway of the UE to the femto serving gateway, and the IP address of the femto serving gateway,
    wherein, if it is determined based on the serving gateway relocation flag that it is necessary to relocate the serving gateway of the UE to the femto serving gateway, the MME stores the IP address of the femto serving gateway in the context information.

3. The method of claim 1, wherein the transmitting of the path switch approval message and the context information to the femto base station comprises:
    if the packet data network connectivity request message has been received from the UE after completing the handover, transmitting the context information to the femto base station; and
    transmitting a packet data network connectivity approval message corresponding to the packet data network connectivity request message to the UE.

4. The method of claim 1, wherein the generating of the context information of the UE for the new session comprises:
    after the receiving of the path switch request message, acquiring the IP address of the femto serving gateway from the serving gateway relocation IE; and
    including the acquired IP address of the femto serving gateway in the context information.

5. The method of claim 1, wherein the generating of the context information of the UE for the new session comprises:
    transmitting a bearer creation request message to the femto serving gateway and receiving a bearer creation response message from the femto serving gateway;
    generating the context information of the UE for the new session; and
    transmitting a packet data network connectivity approval message to the UE,
    wherein the context information of the UE comprises at least one of an IP address of the UE, information on a serving gateway and a packet gateway, and Access Point Name (APN) information.

6. The method of claim 3, further comprising, after the switching of the existing session of the UE to the new session, transmitting a bearer deletion request message, which indicates deletion of a bearer for the UE located within the macro cell, to a serving gateway within the macro cell.

7. A method for switching a session of a User Equipment (UE) by a femto base station of a femto cell in a wireless communication system, the method comprising:
if the UE performs a handover from a macro base station of a macro cell to the femto base station, transmitting a path switch request message, which includes a serving gateway relocation Information Element (IE), to a Mobility Management Entity (MME) of the macro cell, in order to request a switching from an existing session of the UE to a new session managed by the femto base station; and
if the existing session of the UE is switched to the new session in response to the path switch request message, receiving a path switch approval message and context information of the UE for the new session from the MME, the context information including an Internet Protocol (IP) address of the femto serving gateway detected from the serving gateway relocation IE,
wherein the serving gateway relocation IE comprises information requesting relocation of a serving gateway of the UE to a femto serving gateway within the femto cell.

8. The method of claim 7, wherein the serving gateway relocation IE comprises a serving gateway relocation flag indicating that it is necessary to relocate the serving gateway of the UE to the femto serving gateway, and the IP address of the femto serving gateway.

9. The method of claim 7, wherein the receiving of the context information comprises, after the existing session of the UE is switched to the new session, receiving the context information from the MME.

10. The method of claim 7, further comprising, determining if the serving gateway of the UE should be relocated, based on destination information of uplink data transmitted from the UE and based on whether to perform a handover of the UE.

11. A Mobility Management Entity (MME) for switching a session of a User Equipment (UE), the MME comprising:
a receiver for, if the UE performs a handover from a macro base station to a femto base station, receiving a path switch request message, which includes a serving gateway relocation Information Element (IE) for requesting a switching from an existing session of the UE to a new session managed by the femto base station, from the femto base station;
a controller for switching the existing session of the UE to the new session and, if a packet data network connectivity request message has been received from the UE after completing the handover, generating context information of the UE for the new session, the context information including an Internet Protocol (IP) address of the femto serving gateway detected from the serving gateway relocation IE; and
a transmitter for transmitting a path switch approval message and the context information to the femto base station,
wherein the serving gateway relocation IE comprises information requesting relocation of a serving gateway of the UE to a femto serving gateway within the femto cell.

12. The MME of claim 11, wherein the serving gateway relocation IE comprises a serving gateway relocation flag indicating that it is necessary to relocate the serving gateway of the UE to the femto serving gateway, and the IP address of the femto serving gateway,
wherein, if it is determined based on the serving gateway relocation flag that it is necessary to relocate the serving gateway of the UE to the femto serving gateway, the controller stores the IP address of the femto serving gateway in the context information.

13. The MME of claim 11, wherein the transmitter transmits the context information to the femto base station when the packet data network connectivity request message has been received from the UE after completing the handover, and transmits a packet data network connectivity approval message corresponding to the packet data network connectivity request message to the UE.

14. The MME of claim 11, wherein, after the controller generates the context information of the UE for the new session, the controller acquires the IP address of the femto serving gateway from the path switch request message after receiving the path switch request message, and includes the acquired IP address of the femto serving gateway in the context information.

15. The MME of claim 11, wherein the transmitter transmits a bearer creation request message to the femto serving gateway and the receiver receives a bearer creation response message from the femto serving gateway, the controller generates the context information of the UE for the new session, and the transmitter transmits a packet data network connectivity approval message to the UE,
wherein the context information of the UE comprises at least one of an IP address of the UE, information on a serving gateway and a packet gateway, and Access Point Name (APN) information.

16. The MME of claim 13, wherein, after the switching of the existing session of the UE to the new session, the transmitter transmits a bearer deletion request message, which indicates deletion of a bearer for the UE located within the macro cell, to a serving gateway within the macro cell.

17. The MME of claim 16, wherein context information for the new session is created by the UE after transmitting the packet data network connectivity approval message, and the created context information includes the IP address of the femto serving gateway, if the IP address of the femto serving gateway is transmitted from the femto base station to the UE.

18. A femto base station for switching a session of a User Equipment (UE), the femto base station comprising:
a transmitter for, if the UE performs a handover from a macro base station of the macro cell to the femto base station of a femto cell, transmitting a path switch request message, which includes a serving gateway relocation Information Element (IE), to a Mobility Management Entity (MME), in order to request a switching from an existing session of the UE to a new session managed by the femto base station; and
a receiver for, if the existing session of the UE is switched to the new session in response to the path switch request message, receiving a path switch approval message and context information of the UE for the new session from the MME, the context information including an Internet Protocol (IP) address of the femto serving gateway detected from the serving gateway relocation IE,
wherein the serving gateway relocation IE comprises information requesting relocation of a serving gateway of the UE to a femto serving gateway within the femto cell.

19. The femto base station of claim 18, wherein the serving gateway relocation IE comprises a serving gateway relocation flag indicating that it is necessary to relocate the serving gateway of the UE to the femto serving gateway, and the IP address of the femto serving gateway.

20. The femto base station of claim 18, wherein the receiver receives the context information together with the path switch approval message from the MME after the existing session of the UE is switched to the new session.

21. The femto base station of claim 18, further comprising:
a controller for determining if the serving gateway of the UE should be relocated, based on destination information of uplink data transmitted from the UE and based on whether to perform a handover of the UE.

* * * * *